(12) United States Patent
Liang et al.

(10) Patent No.: US 12,324,075 B2
(45) Date of Patent: Jun. 3, 2025

(54) LIGHTING FIXTURE BASED ON DMX CONTROLLER, AND CONTROL METHOD

(71) Applicant: Guangzhou Rising Dragon Recreation Industrial Co., Ltd., Guangzhou (CN)

(72) Inventors: Bo Liang, Guangzhou (CN); Ziqin Guo, Guangzhou (CN); Zhongguo Dai, Guangzhou (CN)

(73) Assignee: Guangzhou Rising Dragon Recreation Industrial Co., Ltd., Guangzhou (CN)

( * ) Notice: Subject to any disclaimer, the term of this patent is extended or adjusted under 35 U.S.C. 154(b) by 219 days.

(21) Appl. No.: 18/305,348

(22) Filed: Apr. 23, 2023

(65) Prior Publication Data

US 2023/0354498 A1    Nov. 2, 2023

(30) Foreign Application Priority Data

Apr. 29, 2022    (CN) .......................... 202210474102.1

(51) Int. Cl.
*H05B 47/10*    (2020.01)
*H05B 47/155*    (2020.01)
*H05B 47/18*    (2020.01)

(52) U.S. Cl.
CPC .......... *H05B 47/18* (2020.01); *H05B 47/155* (2020.01)

(58) Field of Classification Search
CPC ...... H05B 47/10; H05B 47/105; H05B 47/11; H05B 47/14; H05B 47/155; H05B 47/175; H05B 47/18; H05B 47/184; H05B 47/19
See application file for complete search history.

(56) References Cited

U.S. PATENT DOCUMENTS

| | | | |
|---|---|---|---|
| 2022/0210883 A1* | 6/2022 | Chitta | H05B 47/155 |
| 2023/0239978 A1* | 7/2023 | Chitta | G05B 19/102 700/86 |

* cited by examiner

*Primary Examiner* — Long Nguyen
(74) *Attorney, Agent, or Firm* — Andrew C. Cheng

(57) ABSTRACT

The invention provides a lighting fixture based on a DMX controller, and a control method. The lighting fixture includes an NFC address writer, a DMX controller for outputting light control data, NFC controllers receiving data from the DMX controller, and DMX lamps receiving data from the NFC controllers, wherein the DMX controller, the NFC controllers and the DMX lamps are electrically connected in sequence, the NFC address writer is used for modifying address information of the NFC controllers in real time, the NFC controllers selectively extract the light control data output by the DMX controller according to the address information and output the extracted light control data to the DMX lamps, and the DMX lamps change light according to the light control data received from the NFC controllers.

11 Claims, 5 Drawing Sheets

LIGHTING FIXTURE BASED ON DMX CONTROLLER, AND CONTROL METHOD

FIELD

The invention relates to the field of lamps, and particularly to a lighting fixture based on a DMX controller, and a control method.

BACKGROUND

Referring to FIG. 1 which illustrates the connection manner of traditional digital multiplex (DMX) lamps, signal lines of the lamps are associated with a signal bus, such that each lamp can receive all data (512 bytes generally) sent from a controller and can receive corresponding data as actually needed (1-N bytes). Commonly, a 9-position dial switch is added to a DMX lamp to determine the initial position where the lamp starts to receive data, and a control chip in the lamp reads an address value of the dial switch and extracts DMX data according to the address value. This solution can realize simple functions. However, due to the fact that the dial switch is a mechanical switch which results in the waterproof design of the lamp being more difficult, the actual operation being complex, and the housing of some lamps having to be opened to install the dial switch. Thus, there is a desire to provide a lighting fixture which can easily realize the waterproof design and address writing.

SUMMARY

In view of the problems of the prior art, the invention provides a lighting fixture based on a DMX controller, and a control method.

In one aspect, the invention provides a lighting fixture based on a DMX controller, comprising a DMX controller configured for outputting light control data; at least one NFC controller configured for receiving the light control data output by the DMX controller; DMX lamps configured for receiving the light control data from the NFC controller, wherein the DMX controller, the NFC controller and the DMX lamps are electrically connected in sequence; and an NFC address writer configured for modifying address information of the NFC controller in real time. The NFC controller selectively extracts corresponding DMX data from the light control data according to the address information saved in the NFC controller and output the corresponding DMX data to the DMX lamps such that the DMX lamps change light according to the corresponding DMX data.

Preferably, the NFC controller comprises a receiving circuit and a main control circuit, the receiving circuit is configured for linking with the NFC address writer and storing the address information, and the main control circuit is configured for reading the address information on the receiving circuit, receiving the light control data output by the DMX controller, selectively extracting the corresponding DMX data from the light control data according to the address information, and then outputting the corresponding DMX data to the corresponding DMX lamps.

Preferably, the receiving circuit comprises an NFC transponder, a coil connected to the NFC transponder, and an external circuit.

Preferably, the external circuit comprises a capacitor connected between two ends of the coil.

Preferably, the external circuit comprises a resistor connected between a wireless radio frequency interface and a power supply terminal.

Preferably, the main control circuit comprises an MCU.

Preferably, the at least one NFC controller comprises a plurality of NFC controllers which are connected in parallel.

Preferably, each of the NFC controllers is connected to a predetermined number of the DMX lamps which are connected in series.

Preferably, the DMX controller, the NFC controller and the DMX lamps are connected in series through a data line to realize data transmission.

In another aspect, the present invention provides a control method for a lighting fixture based on a DMX controller, the lighting fixture comprising multiple lamp branches connected to the DMX controller, each of the lamp branches comprising an NFC controller in data connection with the DMX controller and one or more DMX lamps connected in series with the NFC controller. The control method comprises:

the NFC controllers in the multiple lamp branches respectively receiving and saving address information sent by an NFC address writer;

the NFC controllers respectively receiving light control data sent by the DMX controller; and the NFC controller in each of the lamp branches, selecting corresponding DMX data from the light control data according to the address information saved in the NFC controller, and controlling the DMX lamps in the lamp branch, where the NFC controller is located, to change light according to the DMX data.

Preferably, the step of the NFC controllers in the multiple lamp branches respectively receiving and saving address information sent by an NFC address writer comprises:

the NFC address writer receiving address information configured for a currently selected lamp branch;

the NFC address writer sending the address information to the NFC controller in the selected lamp branch;

determining whether the configuration of address information of all the lamp branches is completed;

if no, returning to the step of the NFC address writer receiving address information configured for a currently selected lamp branch; or if yes, completing the configuration of the address information of the NFC controllers in all the lamp branches.

The lighting fixture based on a DMX controller provided by the invention has the following beneficial effects:

According to the lighting fixture based on a DMX controller, the NFC controllers are added between the DMX controller and the lamps, wireless address writing is realized through near filed communication between the NFC controllers and the NFC address writer, and then the NFC controllers selectively extract light control data output by the DMX controller according to address information to control the DMX lamps; the lighting fixture can realize wireless address writing to control the light change effect of the lamps without additionally installing dial switches on the lamps or transforming the interior of the lamps, a better waterproof effect of the lamps can be realized without changing the structure of the lamps, and the lighting fixture has high universality and practicability in underwater lighting systems; and address writing can be realized through wireless connection between the external NFC address writer and the NFC controllers, which further facilitates the change of the light effect of the lighting fixture.

DESCRIPTION OF THE EMBODIMENTS

A lighting fixture based on a DMX controller provided by the invention will be further described below in conjunction with the accompanying drawings. It should be pointed out that the technical solution and design principle of the invention are expounded below with an optimal technical solution.

It should be noted that, in the whole description of the invention, nouns of locality such as terms including "center", "crosswise", "longitudinal", "lateral", "length", "width", "thickness", "upper", "lower", "front", "back", "left", "right", "vertical", "perpendicular", "horizontal", "top", "bottom", "inner", "outer", "clockwise", "anticlockwise" are used to indicate directional and positional relations based on the accompanying drawings or directional and positional relations commonly called by those ordinarily skilled in the art, merely for the purpose of facilitating and simplifying the description of the invention, and do not indicate or imply that a device or an element referred to must be in a specific direction, or be configured and operated in a specific direction, and thus, they should not be construed as limitations of the specific protection scope of the invention.

Figure 1:
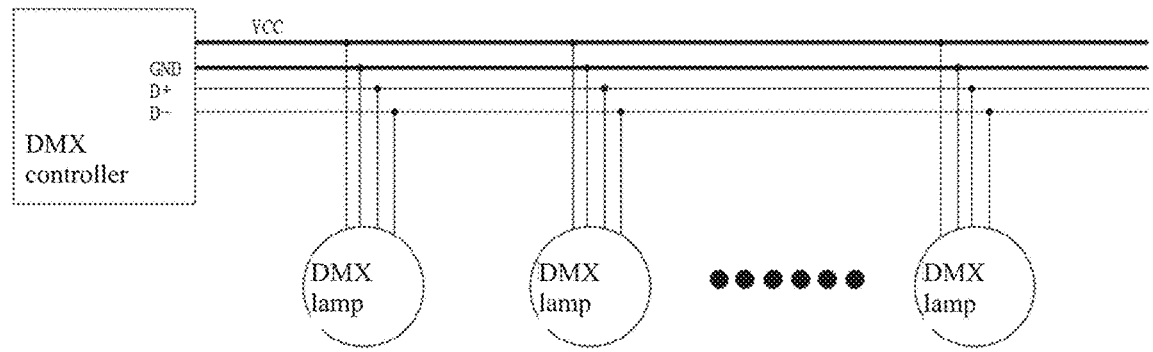
FIG. 1 illustrates a connection manner of traditional DMX lamps.
Figure 2:
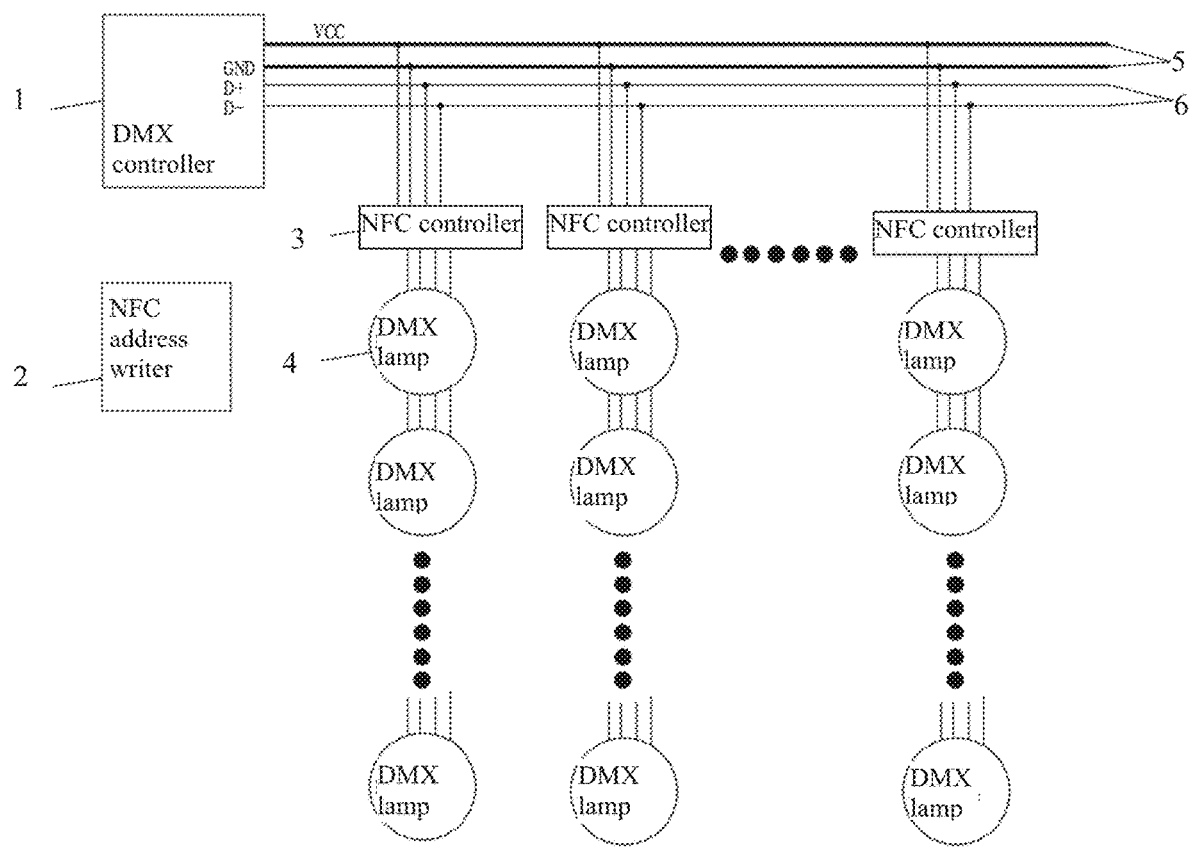
FIG. 2 illustrates a lighting fixture based on a DMX controller according to the invention.

Referring to FIG. 2, a lighting fixture based on a DMX controller according to a first embodiment of the invention comprises an NFC address writer 2, a DMX controller 1 configured for outputting light control data, a plurality of NFC controllers 3 configured for receiving the light control data from the DMX controller 1, and a plurality of DMX lamps 4 configured for receiving data from the NFC controllers 3. The DMX controller 1, the plurality of NFC controllers 3 and the plurality of DMX lamps 4 are electrically connected in sequence. The NFC address writer 2 is configured for wirelessly modifying address information of the NFC controllers 2 in real time. The NFC controllers 3 is configured for selectively extracting the light control data (referred to as DMX data hereinafter) output by the DMX controller 1 according to the address information, and output extracted light control data to the DMX lamps 4, and the DMX lamps 4 change light according to the light control data received from the NFC controllers 3, wherein the DMX controller 1, the NFC controllers 3 and the DMX lamps 4 are connected to a power supply through power lines 5, and the DMX controller 1, the NFC controllers 3 and the MDX lamps 4 are connected in series through data lines 6 to realize data communication.

The DMX lamps 4 are divided into multiple lamp branches, and each lamp branch may comprise one DMX lamp, or multiple DMX lamps connected in series. One NFC controller 3 is correspondingly connected to each lamp branch in series, that is, the one or more DMX lamps in each lamp branch receive the corresponding DMX data through the NFC controller 3 in this lamp branch. Light control such as turning-on, turning-off, frequency adjustment, rotation by a certain angle, and light angle adjustment of the DMX lamps in different lamp branches is performed according to the corresponding DMX data. The lighting fixture outputs, through the DMX controller, light control data used for controlling cooperation of multiple lamp branches to realize an overall lighting effect, and the lamp branches select, through the NFC controllers 3, the corresponding light control data (DMX data) from the light control data output by the DMX controller 1 according to address information sent from the NFC address writer 2. The NFC address writer 2 can dynamically modify the address information of the NFC controllers 3 to dynamically adjust light emitted by the lamp branches, such that the lighting fixture can dynamically represent a desired light effect in different circumstances.

Wherein, the NFC address writer 2 may be various smart electronic devices supporting near field communication (NFC), such as a smartphone and a tablet personnel computer. Users can configure address information of the lamp branches one by one by means of the NFC address writer 2, and then send the corresponding address information to the NFC controllers 3 in the lamp branches by means of the NFC address writer 2 through the NFC communication technique. In an optional example, an APP used for configuring the lighting fixture may be installed in the NFC address writer 2. For example, a corresponding identity tag may be attached to the lighting fixture, the APP can be opened to scan the identity tag to recognize identify information such as the model of the lighting fixture, then switches to a configuration page of the lighting fixture where the corresponding model is displayed, and users can input or modify the address information of the lamp branches in the configuration page of the lighting fixture of the corresponding model, such that the address information of the lamp branches in the lighting fixture can be modified in real time.

Wherein, the NFC controllers 3 selectively extract the light control data output by the DMX controller 1 according to the address information, which means that the NFC controller 3 in each lamp branch extracts data, corresponding to address information of the lamp branch, from the light control data output by the DMX controller 1 according to corresponding address information sent from the NFC address writer 2, such that users can configure the address information of each lamp branch in the lighting fixture in real time to control the light change effect of the DMX lamps 4 in the lamp branches, so as to control the overall dynamic lighting effect of the lighting fixture.

Figure 3:
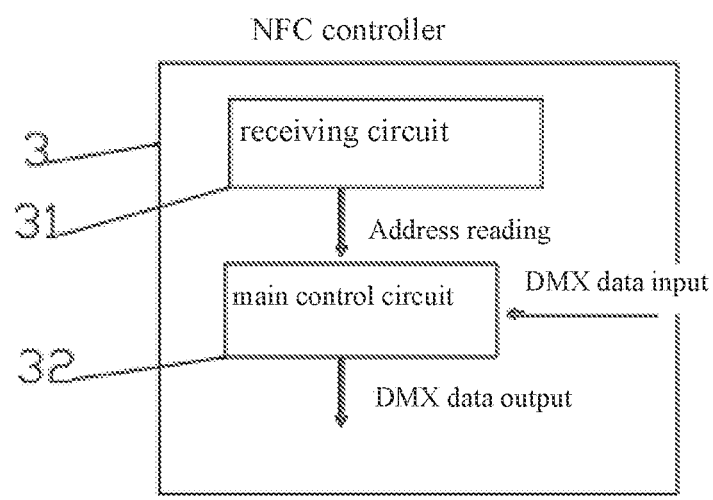
FIG. 3 illustrates a logic structural diagram of an NFC controller in FIG. 2.
Figure 4:
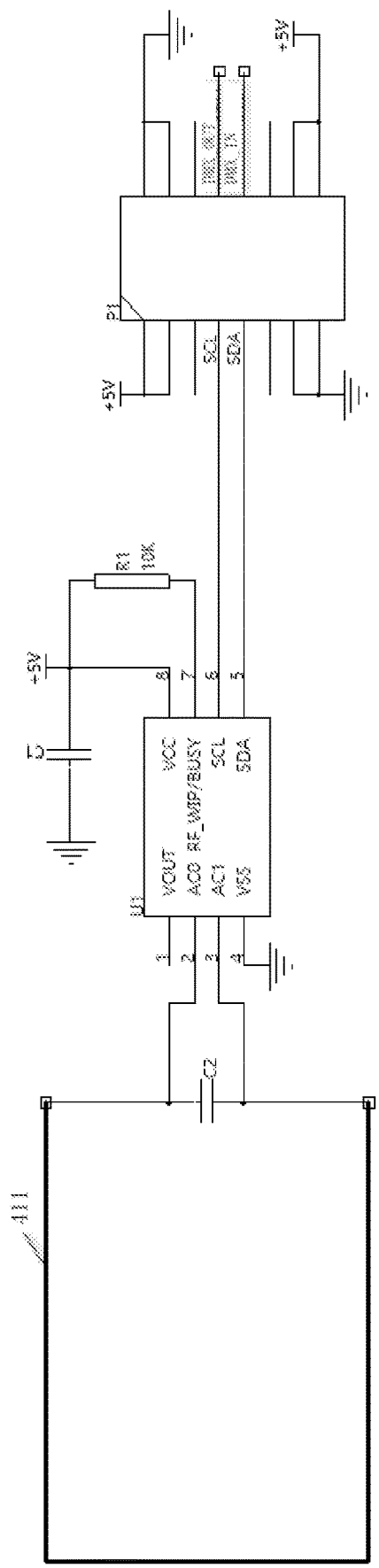
FIG. 4 illustrates a circuit diagram of the NFC controller in FIG. 2.

Wherein, referring to FIGS. 2-4, the NFC controller 3 according to the first embodiment of the invention specifically comprises a receiving circuit 31 and a main control circuit 32. The receiving circuit 31 is configured to link with the NFC address writer 2 to realize wireless address writing through the NFC technique and stores the address information. The main control circuit 32 is configured for reading the address information on the receiving circuit 31, receiving the DMX data output by the DMX controller 1, and selectively extracting the DMX data according to the address information and outputting the extracted DMX data to the corresponding DMX lamps. Specifically, the receiving circuit 31 comprises an NFC transponder U1, the specific model of which is any one of M24LT04E or PN532/544 or NTag203/210/213/215/216 or CLRC663 or FSV9563 or BCM20203, a coil 411 connected to the NFC transponder U1, and an external circuit, wherein two ends of the coil 411 are connected to an AC0 interface and an AC1 interface of the NFC transponder U1 respectively, and the external circuit comprises a capacitor C2 connected between the coil 411 and the NFC transponder U1, and a resistor R1 and a capacitor C1 which are connected to a wireless radio frequency interface (RF_WIP/BUSY interface) of the NFC transponder U1. Wherein, the capacitor C2 is connected between the two ends of the coil 411, that is, the capacitor C2 is connected between the AC0 interface and the AC1 interface of the NFC transponder U1. The coil 411 acts as a receiving coil to allow data reception and transmission between the NFC address writer 2 and the NFC controller 3 which is used as a receiving end. When the coil 411 realizes signal reception and transmission through AC signals that generate oscillations, and the capacitor C2 can filter out extra high-frequency pulse interference signals generated due to oscillations of the coil 411. A power interface (ACC interface) of the NFC transponder U1 is connected to a power supply terminal in the lighting fixture, the capacitor C1 is connected between the power supply terminal and a grounding terminal, and the resistor R1 is connected between the power supply terminal and the RF_WIP/BUSY interface of the NFC transponder U1. The capacitor C1 can filter out clutters of the power supply terminal and restrain electric noise interference, and the resistor R1 is a pull-up resistor which can clamp the voltage of the RF_WIP/BUSY interface of the NFC transponder U1 at a high level to remove write protection of the NFC transponder U1, such that a main control chip (MCU P1) can perform data reading/writing on the NFC transponder U1. The main control circuit 32 specifically comprises an MCU P1, which is connected to an SCL interface and an SDA interface of the NFC transponder U1 to receive address information, a DMX_IN interface of the MCU P1 is in data connection with the DMX controller 1 to receive DMX data, and a DMX_OUT interface of the MCU P1 is in data connection with one DMX lamp 4 to send processed DMX data.

In addition, in this embodiment, the plurality of NFC controllers 3 are connected in parallel, each NFC controller 3 is connected in series with a plurality of DMX lamps 4, and users can drive the NFC controller 3 by means of the DMC controller 1 to control the DMX lamps 4 connected in series with the NFC controller 3.

According to the lighting fixture based on a DMX controller provided by the invention, through the NFC technique, receiving addresses of lamps can be rewritten more conveniently, and the setting of dial switches of traditional DMX lamps can be omitted, such that the lighting fixture can be used in more occasions, for example, the lighting fixture can be used as an underwater lighting fixture; through wireless address modification, the waterproof level of the lamps can be improved; the addresses can be modified merely by modifying the NFC controllers, without writing addresses to the lamps, such that the degree of freedom of the installation positions of the lamps is further improved; in addition, each NFC controller controls multiple lamps connected thereto in series, which compared with the prior art in which dial switches are installed, the cost of the lamps is reduced.

Figure 5:
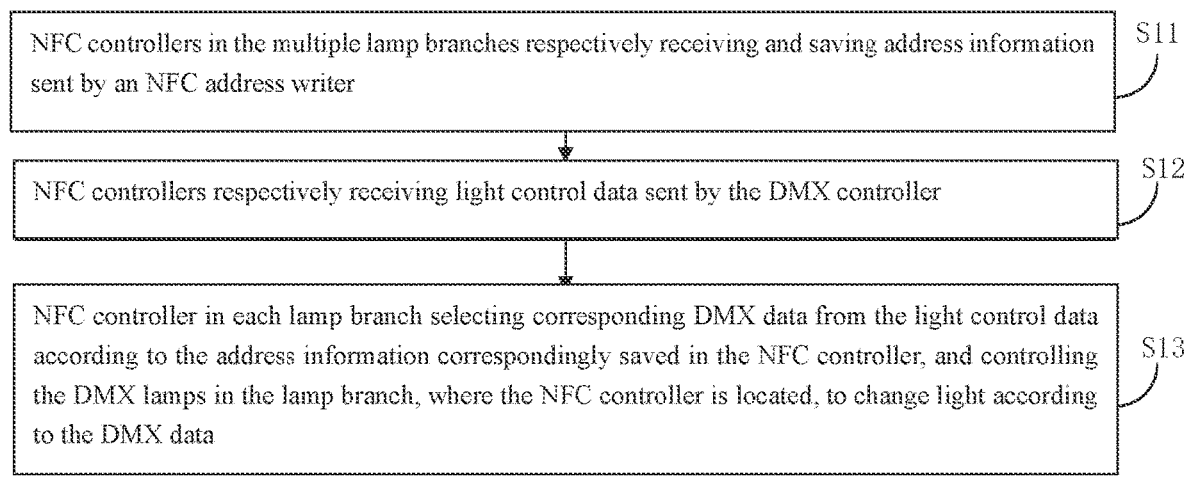
FIG. 5 illustrates a flow diagram of a control method for a lighting fixture based on a DMX controller according to one embodiment of the invention.

In the other aspect, as shown in FIG. 5, the invention further provides a control method for a lighting fixture based on a DMX controller, wherein the lighting fixture comprises multiple lamp branches connected to a DMX controller, each lamp branch comprises an NFC controller in data connection with the DMX controller and DMX lamps connected in series with the NFC controller, and the control method comprises:

S11: the NFC controllers in the multiple lamp branches respectively receiving and saving address information sent by an NFC address writer;

S12: the NFC controllers respectively receiving light control data sent by the DMX controller; and S13: the NFC controller in each lamp branch selecting corresponding DMX data from the light control data according to the corresponding address information saved in the NFC controller, and controlling the DMX lamps in the lamp branch, where the NFC controller is located, to change light according to the DMX data.

In this embodiment, the NFC controllers are additionally installed in the lamp branches of the lighting fixture to receive light control data sent by the DMX controller and select DMX data corresponding to the lamp branches, where the NFC controllers are located, from the light control data to control the lighting effect of the DMX lamps in the lamp branches according to the DMX data, such that the lighting effect of the lamp branches can be independently controlled by the corresponding NFC controllers, addresses information do not need to be written into the lamps, the degree of freedom of the installation positions of the lamps is improved, and the number of the DMX lamps can be increased or decreased conveniently as actually needed. In addition, the address information saved in the NFC controllers in the lamp branches can be easily modified in real time through the NFC address writer to adjust different lighting effects of the lamp branches, such that users can conveniently adjust the overall lighting effect of the lighting fixture according to the requirements in different scenes.

Figure 6:
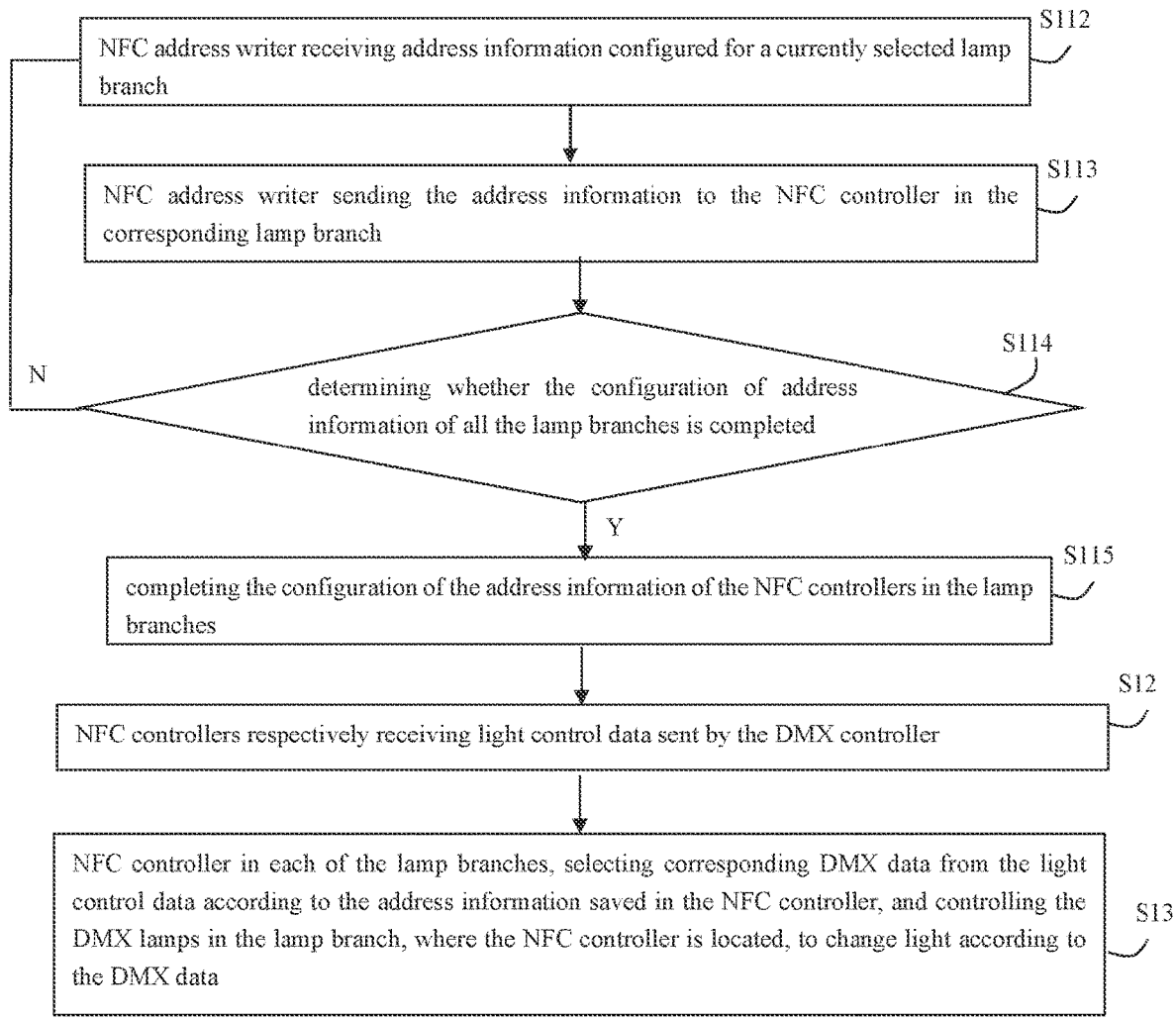
FIG. 6 illustrates a flow diagram of a control method for a lighting fixture based on a DMX controller according to another embodiment of the invention.

Optionally, referring to FIG. 6, the lighting fixture further comprises the NFC address writer, and S11: the NFC controllers in the multiple lamp branches respectively receiving and saving address information sent by an NFC address writer comprises:

S112: the NFC address writer receiving address information configured for a currently selected lamp branch;

S113: the NFC address writer sending the address information to the NFC controller in the corresponding lamp branch;

S114: determining whether the configuration of address information of all the lamp branches in the lighting fixture is completed; if no, returning to S112; if yes, performing S115; and S115: completing the configuration of the address information of the NFC controllers in the lamp branches.

Wherein, users can select the lamp branch, where address information is to be input currently or the address information in which needs to be modified currently, from the lamp branches in the lighting fixture one by one, and correspondingly configure the address information for the lamp branches one by one through the NFC address writer, such that users can modify the address information of the lamp branches according to personal requirements to obtain a desired overall lighting effect of the lighting fixture.

The above embodiments are merely preferred ones of the invention. It should be pointed out that the above embodiments should not be construed as limitations of the invention, and the protection scope of the invention should be defined by the claims. Those ordinarily skilled in the art can make various improvements and embellishments without departing from the spirit and scope of the invention, and all these improvements and embellishments should fall within the protection scope of the invention.

What is claimed is:

1. A lighting fixture based on a digital multiplex (DMX) controller, comprising:

the DMX controller configured for outputting light control data;
at least one near field communication (NFC) controller configured for receiving the light control data output by the DMX controller;
DMX lamps configured for receiving the light control data from the NFC controller, wherein the DMX controller, the NFC controller and the DMX lamps are electrically connected in sequence; and
an NFC address writer configured for modifying address information of the NFC controller in real time;
wherein the NFC controller selectively extracts a corresponding DMX data from the light control data according to the address information saved in the NFC controller and output the corresponding DMX data to the DMX lamps such that the DMX lamps change light according to the corresponding DMX data.

2. The lighting fixture based on a DMX controller according to claim 1, wherein the NFC controller comprises a receiving circuit and a main control circuit, the receiving circuit is configured for linking with the NFC address writer and storing the address information, and the main control circuit is configured for reading the address information on the receiving circuit, receiving the light control data output by the DMX controller, selectively extracting the corresponding DMX data from the light control data according to the address information, and then outputting the corresponding DMX data to the corresponding DMX lamps.

3. The lighting fixture based on a DMX controller according to claim 2, wherein the receiving circuit comprises an NFC transponder, a coil connected to the NFC transponder, and an external circuit.

4. The lighting fixture based on a DMX controller according to claim 3, wherein the external circuit comprises a capacitor connected between two ends of the coil.

5. The lighting fixture based on a DMX controller according to claim 3, wherein the external circuit comprises a resistor connected between a wireless radio frequency interface and a power supply terminal.

6. The lighting fixture based on a DMX controller according to claim 2, wherein the main control circuit comprises a main control chip (MCU).

7. The lighting fixture based on a DMX controller according to claim 1, wherein the at least one NFC controller comprises a plurality of NFC controllers which are connected in parallel.

8. The lighting fixture based on a DMX controller according to claim 7, wherein each of the NFC controllers is connected to a predetermined number of the DMX lamps which are connected in series.

9. The lighting fixture based on a DMX controller according to claim 1, wherein the DMX controller, the NFC controller and the DMX lamps are connected in series through a data line to realize data transmission.

10. A control method for a lighting fixture based on a digital multiplex (DMX) controller, the lighting fixture comprising multiple lamp branches connected to the DMX controller, each of the lamp branches comprising a near field communication (NFC) controller in data connection with the DMX controller and one of more DMX lamps connected in series with the NFC controller, the control method comprising:
the NFC controllers in the multiple lamp branches respectively receiving and saving address information sent by an NFC address writer;
the NFC controllers respectively receiving light control data sent by the DMX controller; and
the NFC controller in each of the lamp branches, selecting corresponding DMX data from the light control data according to the address information saved in the NFC controller, and controlling the DMX lamps in the lamp branch, where the NFC controller is located, to change light according to the DMX data.

11. The control method according to claim 10, wherein the lighting fixture further comprises the NFC address writer, and the step of the NFC controllers in the multiple lamp branches respectively receiving and saving address information sent by an NFC address writer comprises:
the NFC address writer receiving address information configured for a currently selected lamp branch;
the NFC address writer sending the address information to the NFC controller in the selected lamp branch;
determining whether the configuration of address information of all the lamp branches is completed;
if no, returning to the step of the NFC address writer receiving address information configured for a currently selected lamp branch; or
if yes, completing the configuration of the address information of the NFC controllers in all the lamp branches.

* * * * *